(12) United States Patent
Evans et al.

(10) Patent No.: US 8,141,222 B2
(45) Date of Patent: Mar. 27, 2012

(54) METHOD OF ASSEMBLING A BLOWING INSULATION MACHINE

(75) Inventors: Michael E. Evans, Granville, OH (US); Christopher M. Relyea, Columbus, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 42 days.

(21) Appl. No.: 12/723,850

(22) Filed: Mar. 15, 2010

(65) Prior Publication Data
US 2011/0214278 A1 Sep. 8, 2011

Related U.S. Application Data

(63) Continuation-in-part of application No. 11/581,661, filed on Oct. 16, 2006, now Pat. No. 7,819,349, and a continuation-in-part of application No. 11/581,659, filed on Oct. 16, 2006, now Pat. No. 7,731,115.

(51) Int. Cl.
*B21D 39/03* (2006.01)
(52) U.S. Cl. ....................................................... 29/428
(58) Field of Classification Search .................... 29/428; 241/60, 285.1, 285.2, 605
See application file for complete search history.

(56) References Cited

U.S. PATENT DOCUMENTS

| | | | | |
|---|---|---|---|---|
| 3,051,398 A | * | 8/1962 | Babb | 241/136 |
| 4,381,082 A | * | 4/1983 | Elliott et al. | 241/186.5 |
| 6,109,488 A | * | 8/2000 | Horton | 222/636 |

* cited by examiner

*Primary Examiner* — Mark Rosenbaum
(74) *Attorney, Agent, or Firm* — MacMillian, Sobanski & Todd, LLC (57) ABSTRACT

Methods of assembling machines for distributing loosefill insulation from packages of compressed loosefill insulation are provided. The methods include the steps of providing a chute having an inlet end, the inlet end configured to receive the package of compressed loosefill insulation, providing a lower unit including a shroud, the lower unit being configured to be attached to the chute to form the machine, the lower unit having an outlet for the discharge of loosefill insulation, installing a plurality of shredders in the lower unit, the shredders being configured to shred and pick apart the loosefill insulation, installing a discharge mechanism in the lower unit, the discharge mechanism being configured to discharge loosefill insulation from the outlet of the lower unit, providing a bottom wall structure, the bottom wall structure having a first bottom wall spaced apart from a second bottom wall and connecting the bottom wall structure to the shroud.

4 Claims, 6 Drawing Sheets

METHOD OF ASSEMBLING A BLOWING INSULATION MACHINE

RELATED APPLICATIONS

The present application is a continuation-in-part of co-pending U.S. patent application Ser. No. 11/581,661, entitled ENTRANCE CHUTE FOR BLOWING WOOL MACHINE, filed Oct. 16, 2006, and co-pending U.S. patent application Ser. No. 11/581,659, entitled AGITATION SYSTEM FOR BLOWING WOOL MACHINE, filed Oct. 16, 2006, the disclosures of which are incorporated herein by reference in their entirety.

BACKGROUND

In the insulation of buildings, a frequently used insulation product is loosefill insulation. In contrast to the unitary or monolithic structure of insulation batts or blankets, loosefill insulation is a multiplicity of discrete, individual tufts, cubes, flakes or nodules. Loosefill insulation is usually applied to buildings by blowing the loosefill insulation into an insulation cavity, such as a wall cavity or an attic of a building. Typically loosefill insulation is made of glass fibers although other mineral fibers, organic fibers, and cellulose fibers can be used.

Loosefill insulation, also referred to as blowing wool, is typically compressed and encapsulated in a bag. The compressed loosefill insulation and the bag form a package. Packages of compressed loosefill insulation are used for transport from an insulation manufacturing site to a building that is to be insulated. The bags can be made of polypropylene or other suitable materials. During the packaging of the loosefill insulation, it is placed under compression for storage and transportation efficiencies. The compressed loosefill insulation can be packaged with a compression ratio of at least about 10:1. The distribution of loosefill insulation into an insulation cavity typically uses a blowing insulation machine that feeds the loosefill insulation pneumatically through a distribution hose. Blowing insulation machines can have a chute or hopper for containing and feeding the compressed loosefill insulation after the package is opened and the compressed loosefill insulation is allowed to expand.

It would be advantageous if the blowing insulation machines could be assembled more efficiently.

SUMMARY

The above objects as well as other objects not specifically enumerated are achieved by methods of assembling machines for distributing loosefill insulation from packages of compressed loosefill insulation. The methods include the steps of providing a chute having an inlet end, the inlet end configured to receive the package of compressed loosefill insulation, providing a lower unit including a shroud, the lower unit being configured to be attached to the chute to form the machine for distributing loosefill insulation, the lower unit having an outlet for the discharge of loosefill insulation, installing a plurality of shredders in the lower unit, the shredders being configured to shred and pick apart the loosefill insulation, installing a discharge mechanism in the lower unit, the discharge mechanism being configured to discharge loosefill insulation from the outlet of the lower unit, providing a bottom wall structure, the bottom wall structure having a first bottom wall spaced apart from a second bottom wall and connecting the bottom wall structure to the shroud.

According to this invention there are also provided methods of assembling machines for distributing loosefill insulation from packages of compressed loosefill insulation. The method include the steps of providing a chute having an inlet end, the inlet end configured to receive the package of compressed loosefill insulation, providing a lower unit configured to be attached to the chute to form the machine for distributing loosefill insulation, the lower unit having an outlet for the discharge of loosefill insulation, providing a plurality of shredder shafts being configured for installation in the lower unit, providing a plurality of paddle assemblies being configured for installation on the shredder shafts, assembling the plurality of paddle assemblies on the plurality of shredder shafts in a manner such that paddle assemblies on one shredder shaft correspond to paddle assemblies on another shaft, the plurality of paddle assemblies on one shredder shaft having a major axis and the corresponding paddle assemblies on the other shredder shaft each having a major axis, and arranging the plurality of paddle assemblies in a manner that the major axes of the corresponding paddle assemblies have an indexed arrangement.

According to this invention there are also provided methods of assembling machines for distributing loosefill insulation from packages of compressed loosefill insulation. The methods include the steps of providing a chute having an inlet end, the inlet end configured to receive the package of compressed loosefill insulation, providing a plurality of shredders and positioning the shredders within the machine, the shredders being configured to shred and pick apart the loosefill insulation, the shredders including a plurality of paddle assemblies attached to shredder shafts, locking the paddle assemblies to the shredder shafts by twisting the paddle assemblies and positioning a discharge mechanism downstream from the shredders, the discharge mechanism configured to distribute the loosefill insulation into an airstream.

According to this invention there are also provided methods of assembling machines for distributing loosefill insulation from packages of compressed loosefill insulation. The methods include the steps of providing a chute having an inlet end, the inlet end configured to receive the package of compressed loosefill insulation, providing a plurality of shredders and positioning the shredders within the machine, the shredders being configured to shred and pick apart the loosefill insulation, attaching a plurality of paddle assemblies to the shredder shafts in a manner such that adjacent paddle assemblies are offset from each other and positioning a discharge mechanism downstream from the shredders, the discharge mechanism configured to distribute the loosefill insulation into an airstream.

Various objects and advantages of this invention will become apparent to those skilled in the art from the following detailed description of the preferred embodiment, when read in light of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, the description and figures disclose methods of assembling blowing insulation machines. The term "loosefill insulation", as used herein, is defined to any insulation materials configured for distribution in an airstream. The term "finely condition", as used herein, is defined to mean the shredding of loosefill insulation to a desired density prior to distribution into an airstream.

Figure 1:
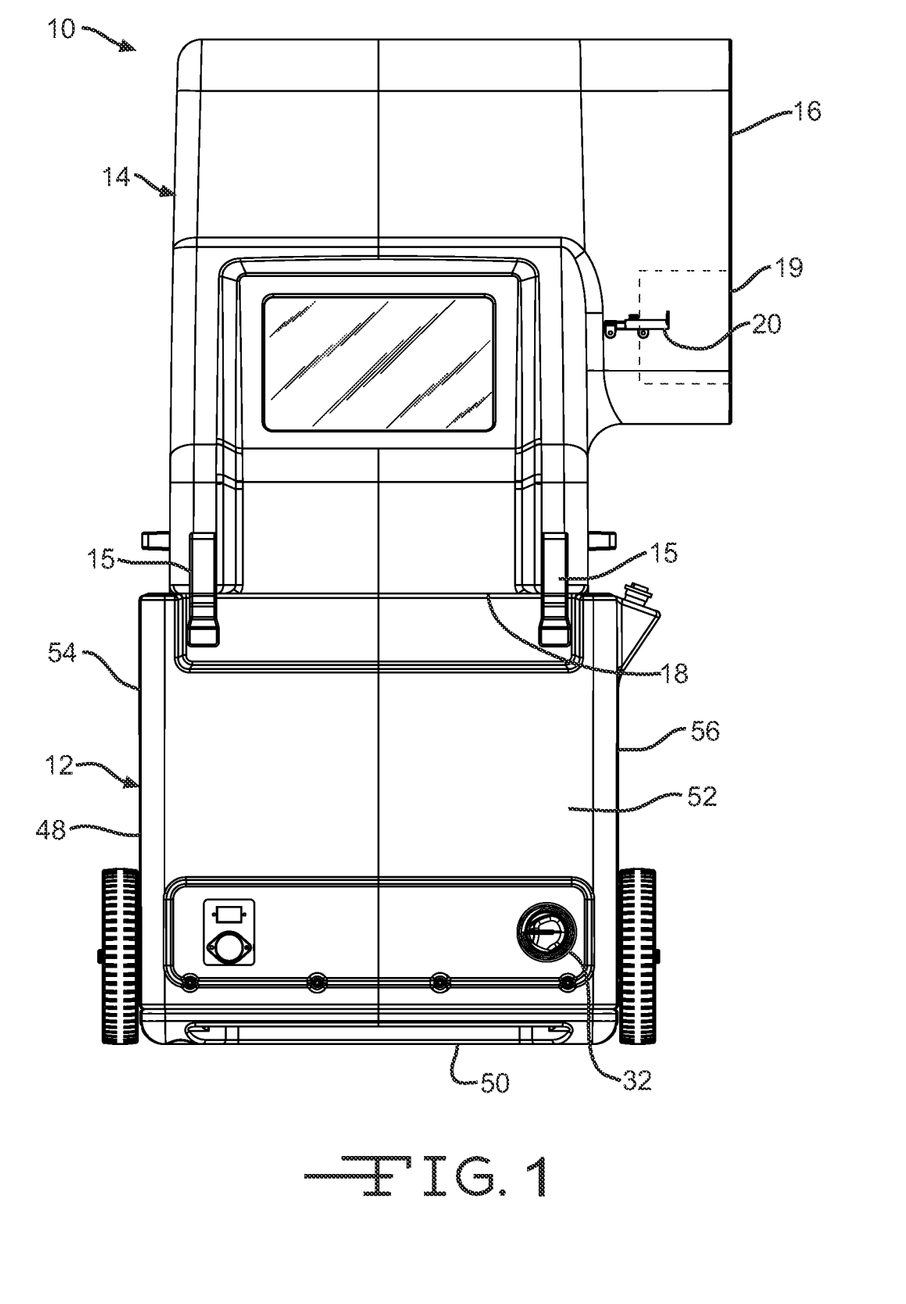
FIG. 1 is a front view in elevation of a blowing insulation machine.
Figure 2:
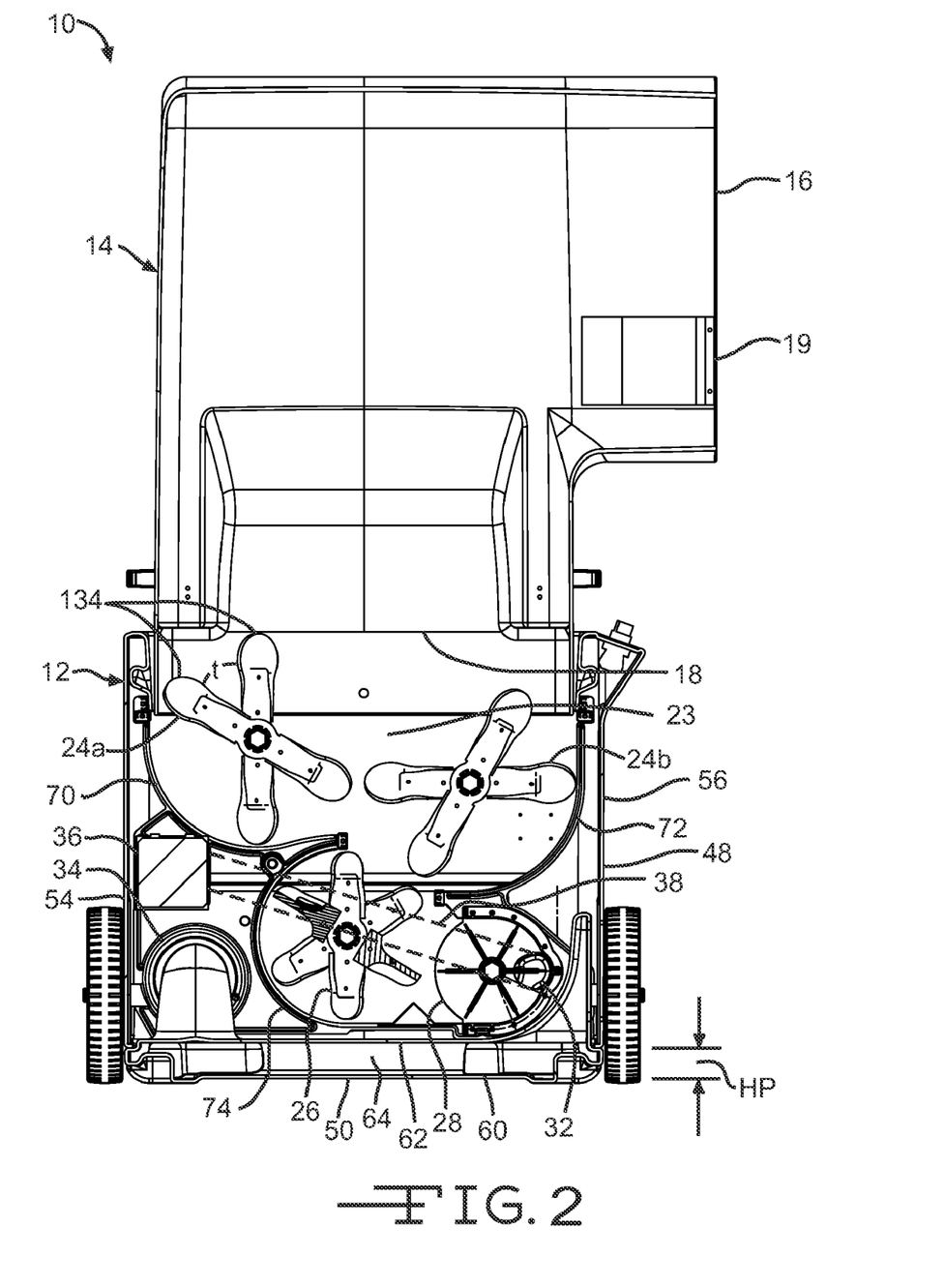
FIG. 2 is a front view in elevation, partially in cross-section, of the blowing insulation machine of FIG. 1.
Figure 3:
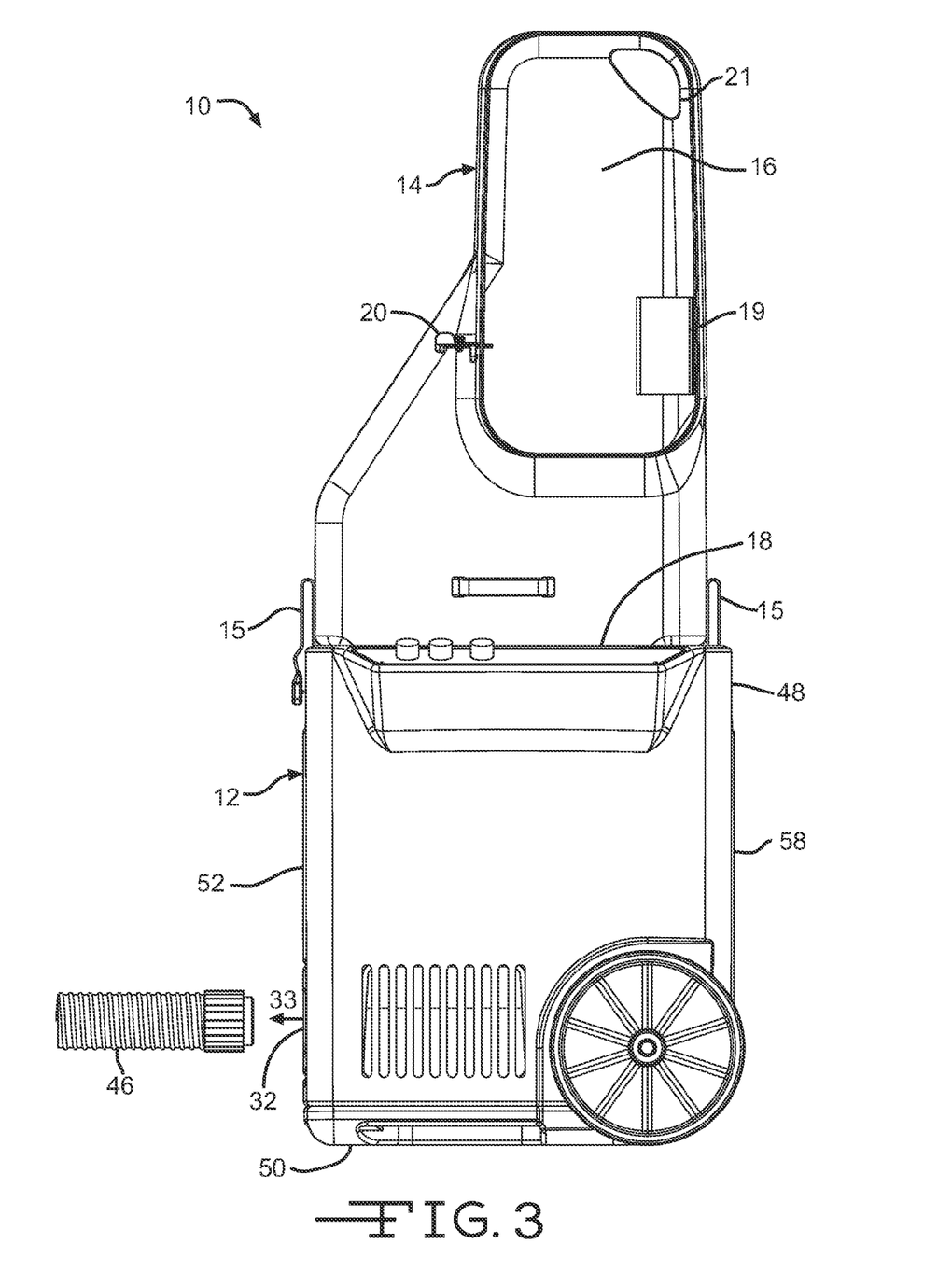
FIG. 3 is a side view in elevation of the blowing insulation machine of FIG. 1.

A blowing insulation machine 10 configured for distributing compressed loosefill insulation is shown in FIGS. 1-3. The blowing insulation machine 10 includes a lower unit 12 and a chute 14. The lower unit 12 can be connected to the chute 14 by a plurality of fastening mechanisms 15 configured to readily assemble and disassemble the chute 14 to the lower unit 12. As further shown in FIGS. 1-3, the chute 14 has an inlet end 16 and an outlet end 18.

The chute 14 is configured to receive compressed loosefill insulation and introduce the loosefill insulation to a shredding chamber 23 as shown in FIG. 2. Optionally, the chute 14 can include a handle segment 21, as shown in FIG. 3, to facilitate easy movement of the blowing insulation machine 10 from one location to another. However, the handle segment 21 is not necessary to the operation of the blowing insulation machine 10.

As further shown in FIGS. 1-3, the chute 14 can include an optional guide assembly 19 mounted at the inlet end 16 of the chute 14. The guide assembly 19 is configured to urge a package of compressed loosefill insulation against an optional cutting mechanism 20, as shown in FIGS. 1 and 3, as the package moves into the chute 14.

As shown in FIG. 2, the shredding chamber 23 is mounted at the outlet end 18 of the chute 14. In the illustrated embodiment, the shredding chamber 23 includes a plurality of low speed shredders 24a and 24b and an agitator 26. The low speed shredders 24a and 24b are configured to shred and pick apart the loosefill insulation as the loosefill insulation is discharged from the outlet end 18 of the chute 14 into the lower unit 12. Although the blowing insulation machine 10 is shown with a plurality of low speed shredders 24, any type of separator, such as a clump breaker, beater bar or any other mechanism that shreds and picks apart the loosefill insulation can be used.

As further shown in FIG. 2, the shredding chamber 23 includes an agitator 26 configured to finely condition the loosefill insulation. In the illustrated embodiment as shown in FIG. 2, the agitator 26 is positioned beneath the low speed shredders 24a and 24b. Alternatively, the agitator 26 can be positioned in any desired location relative to the low speed shredders 24a and 24b, such as horizontally adjacent to the shredders 24a and 24b, sufficient to receive the loosefill insulation from the low speed shredders 24a and 24b. In the illustrated embodiment, the agitator 26 is a high speed shredder. Alternatively, any type of shredder can be used, such as a low speed shredder, clump breaker, beater bar or any other mechanism configured to finely condition the loosefill insulation and prepare the loosefill insulation for distribution into an airstream.

In the embodiment illustrated in FIG. 2, the low speed shredders 24a and 24b rotate at a lower speed than the agitator 26. The low speed shredders 24a and 24b rotate at a speed of about 40-80 rpm and the agitator 26 rotates at a speed of about 300-500 rpm. In other embodiments, the low speed shredders 24a and 24b can rotate at a speed less than or more than 40-80 rpm, provided the speed is sufficient to shred and pick apart the loosefill insulation. The agitator 26 can rotate at a speed less than or more than 300-500 rpm provided the speed is sufficient to finely condition the loosefill insulation and prepare the loosefill insulation for distribution into an airstream.

Referring again to FIG. 2, a discharge mechanism 28 is positioned adjacent to the agitator 26 and is configured to distribute the finely conditioned loosefill insulation into an airstream. In this embodiment, the finely conditioned loosefill insulation is driven through the discharge mechanism 28 and through a machine outlet 32 by an airstream provided by a blower 36 mounted in the lower unit 12. The airstream is indicated by an arrow 33 as shown in FIG. 3. In other embodiments, the airstream 33 can be provided by other methods, such as by a vacuum, sufficient to provide an airstream 33 driven through the discharge mechanism 28. In the illustrated embodiment, the blower 36 provides the airstream 33 to the discharge mechanism 28 through a duct 38, shown in phantom in FIG. 2 from the blower 36 to the rotary valve 28. Alternatively, the airstream 33 can be provided to the discharge mechanism 28 by other structures, such as a hose or pipe, sufficient to provide the discharge mechanism 28 with the airstream 33.

The shredders 24a and 24b, agitator 26, discharge mechanism 28 and the blower 36 are mounted for rotation. They can be driven by any suitable means, such as by a motor 34, or any other means sufficient to drive rotary equipment. Alternatively, each of the shredders 24a and 24b, agitator 26, discharge mechanism 28 and blower 36 can be provided with its own motor.

In operation, the chute 14 guides the loosefill insulation to the shredding chamber 23. The shredding chamber 23 includes the low speed shredders 24a and 24b configured to shred and pick apart the loosefill insulation. The shredded loosefill insulation drops from the low speed shredders 24a and 24b into the agitator 26. The agitator 26 finely conditions the loosefill insulation for distribution into the airstream 33 by further shredding the loosefill insulation. The finely conditioned loosefill insulation exits the agitator 26 and enters the discharge mechanism 28 for distribution into the airstream 33 caused by the blower 36. The airstream 33, with the finely conditioned loosefill insulation, exits the machine 10 at the machine outlet 32 and flows through a distribution hose 46, as shown in FIG. 3, toward the insulation cavity, not shown.

Referring now to FIGS. 1-3, the lower unit 12 includes a shroud 48 releasably connected to a bottom wall structure 50. The shroud 48 includes a front wall 52, a first side wall 54, a second side wall 56 and a back wall 58. In the illustrated embodiment, the front wall 52, first side wall 54, second side wall 56 and back wall 58 form the shroud 48 as a single molded structure. In other embodiments, the front wall 52, first side wall 54, second side wall 56 and back wall 58 can be distinct components assembled to form the shroud 48. The shroud 48 is configured to be a lightweight and durable covering for the components positioned within the lower unit 12. In the illustrated embodiment, the shroud 48 is made from a thermoplastic polymer material, such as for example polyethylene. In other embodiments, the shroud 48 can be made from other desired materials, such as for example polypropylene, sufficient to be a lightweight and durable covering for the components positioned within the lower unit 12.

In the illustrated embodiment, the shroud 48 is connected to the bottom wall structure 50 by a plurality of threaded fasteners (not shown). However, in other embodiments, the shroud 48 can be connected to the bottom wall structure 50 by other desired methods, including the non-limiting examples of clips or clamps.

Referring now to FIG. 2, the bottom wall structure 50 includes a first bottom wall 60 spaced apart from a second bottom wall 62. In the illustrated embodiment, the first bottom wall 60 is arranged in a generally parallel orientation with the second bottom wall 62. However, in other embodiments, the first bottom wall 60 need not be arranged in a generally parallel orientation with the second bottom wall 62. A passage 64 is formed between the first bottom wall 60 and the second bottom wall 62. The passage 64 has a height HP. In the illustrated embodiment, the height of the passage 64 is in a range of from about 0.50 inches to about 2.0 inches. In other embodiments, the height HP of the passage 64 can be less than about 0.50 inches or more than about 2.0 inches.

The bottom wall structure 50 having the first bottom wall 60 spaced apart from the second bottom wall 62 and forming passage 64 is configured for several purposes. First, the bottom wall structure 50 is configured to provide an inlet for air entering the blower 36 and later formed into the airstream 33 by the blower 36. The air entering the passage 64 travels around the agitator 26 and around the rotary valve 28 to the blower 36. By routing the incoming air through the passage 64 formed in the bottom wall structure 50, the air avoids the path of the loosefill insulation traveling through the lower unit 12.

Second, the bottom wall structure 50, having the first bottom wall 60 spaced apart from the second bottom wall 62, forms a protective structure in which the first bottom wall 60 is configured to absorb undesirable impact with objects underneath the lower unit 12 without substantially transferring the impact to the components of the blowing insulation machine 10 mounted to the second bottom wall 62. In this manner, the bottom wall structure 50 is configured to substantially protect the components of the blowing insulation machine 10 mounted to the second bottom wall 62.

In the illustrated embodiment, the bottom wall structure 50, having the first bottom wall 60 spaced apart from the second bottom wall 62, is formed as a single molded structure. In other embodiments, the bottom wall structure 50, having the first bottom wall 60 spaced apart from the second bottom wall 62, can be distinct components assembled together to form the bottom wall structure 50.

In the illustrated embodiment, the first bottom wall 60 and the second bottom wall 62 are made from a thermoplastic polymer material, such as for example polyethylene. In other embodiments, the first bottom wall 60 and the second bottom wall 62 can be made from other desired materials, such as for example polypropylene, sufficient to be a lightweight and durable covering for the components positioned within the lower unit 12.

Figure 4:
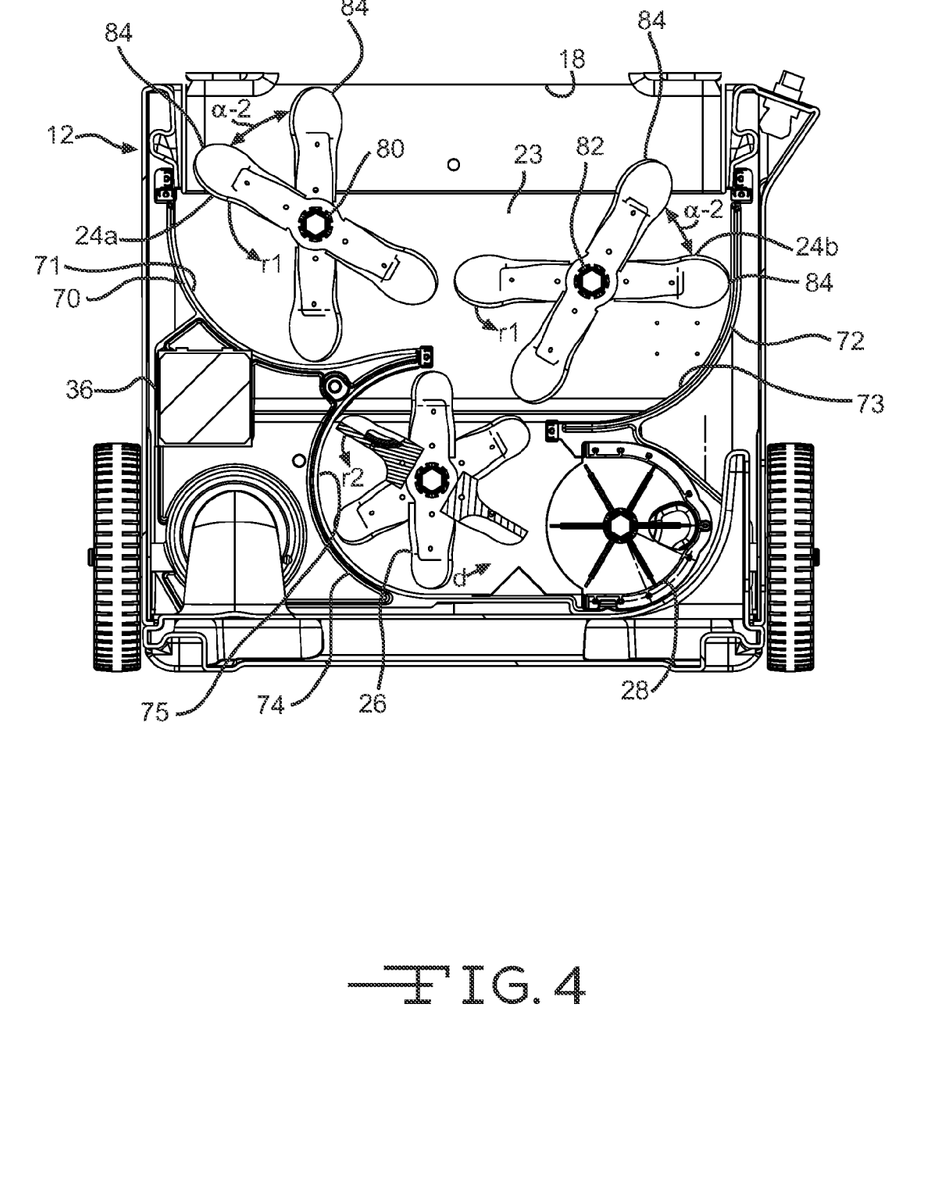
FIG. 4 is a front view, partially in cross-section, of a lower unit of the blowing insulation machine of FIG. 1.

Referring now to FIG. 4, the discharge mechanism 28 is configured to distribute the finely conditioned loosefill insulation into the airstream 33. In this embodiment, the discharge mechanism 28 is a rotary valve. Alternatively, the discharge mechanism 28 can be any other mechanism including staging hoppers, metering devices, or rotary feeders, sufficient to distribute the finely conditioned loosefill insulation into the airstream 33.

Referring again to FIG. 4, the low speed shredders 24a and 24b rotate in a counter-clockwise direction r1 and the agitator 26 rotates in a counter-clockwise direction r2. Rotating the low speed shredders 24a and 24b and the agitator 26 in the same counter-clockwise direction allows the low speed shredders 24a and 24b and the agitator 26 to shred and pick apart the loosefill insulation while substantially preventing an accumulation of unshredded or partially shredded loosefill insulation in the shredding chamber 23. In other embodiments, the low speed shredders 24a and 24b and the agitator 26 each could rotate in a clock-wise direction or the low speed shredders 24a and 24b and the agitator 26 could rotate in different directions provided the relative rotational directions allow finely conditioned loosefill insulation to be fed into the discharge mechanism 28 while preventing a substantial accumulation of unshredded or partially shredded loosefill insulation in the shredding chamber 23.

As further shown FIG. 4, the shredding chamber 23 includes a plurality of guide shells 70, 72 and 74. The upper left guide shell 70 is positioned partially around the low speed shredder 24a and extends to form an arc of approximately 90°. The upper left guide shell 70 has an upper left guide shell inner surface 71. The upper left guide shell 70 is configured to allow the low speed shredder 24a to seal against the upper left guide shell surface 71 and thereby direct the loosefill insulation in a downstream direction as the low speed shredder 24a rotates.

In a similar manner as the upper left guide shell 70, the upper right guide shell 72 is positioned partially around the low speed shredder 24b and extends to form an arc of approximately 90°. The upper right guide shell 72 has an upper right guide shell inner surface 73. The upper right guide shell 72 is configured to allow the low speed shredder 24b to seal against the upper right guide shell inner surface 73 and thereby direct the loosefill insulation in a downstream direction as the low speed shredder 24b rotates.

In a manner similar to the upper guide shells 70 and 72, the lower guide shell 74 is positioned partially around the agitator 26 and extends to form an approximate semi-circle. The lower guide shell 74 has a lower guide shell inner surface 75. The lower guide shell 74 is configured to allow the agitator 26 to seal against the lower guide shell inner surface 75 and thereby direct the loosefill insulation in a downstream direction as the agitator 26 rotates.

In the embodiment illustrated in FIG. 4, the upper guide shell inner surfaces 71 and 73, and the lower guide shell inner surface 75 are made of high density polyethylene (hdpe) configured to provide a lightweight, low friction guide for the loosefill insulation. Alternatively, the upper guide shell inner surfaces 71 and 73, and the lower guide shell inner surface 75 can be made of other materials, such as aluminum, sufficient to provide a sealing surface that allows the low speed shredders 24a, 24b or the agitator 26 to direct the loosefill insulation in a downstream direction.

In the embodiment illustrated in FIG. 4, the upper guide shells 70 and 72 are curved and extend to form an arc of approximately 90°. In other embodiments, the upper guide shells 70 and 72 may be curved and extend to form an arc which is more or less than 90°, such that the upper guide shells 70 and 72 are sufficient to allow the low speed shredders 24a and 24b to seal against the upper guide shell surfaces 71 and 73, thereby directing the loosefill insulation in a downstream direction as the low speed shredders 24a and 24b rotate. Similarly, in the illustrated embodiment, the lower guide shell 74 is curved and extends to form an approximate semi-circle. In another embodiment, the lower guide shell 74 may be curved and extend to form an arc which is more or less than a semi-circle, such that the lower guide shell 74 is sufficient to allow the agitator 26 to seal against the lower guide shell surface 75, thereby directing the loosefill insulation in a downstream direction as the agitator 26 rotates.

Figure 5:
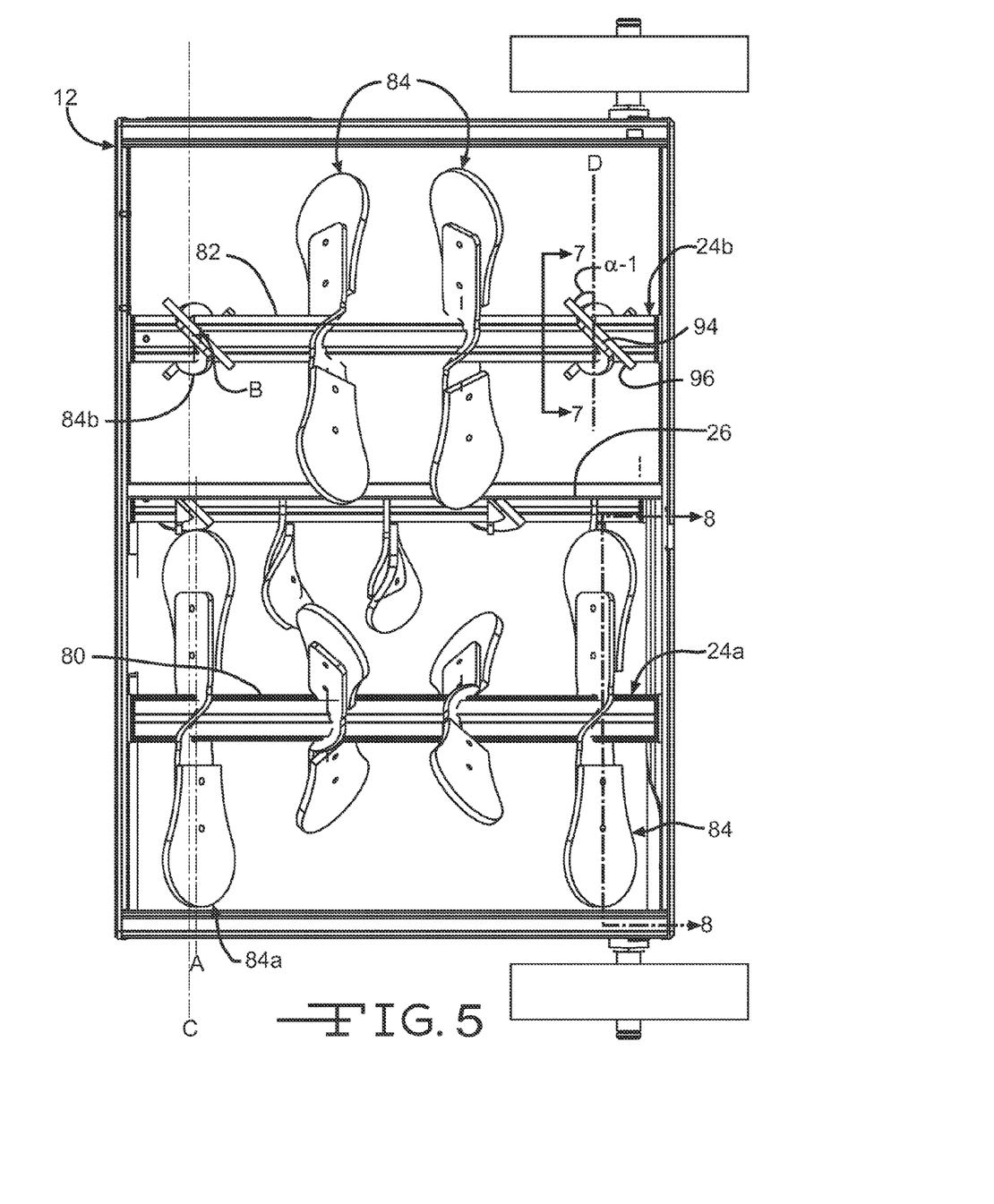
FIG. 5 is a plan view of a shredding chamber of the lower unit of the blowing insulation machine of FIG. 4.

As shown in FIG. 2 and as discussed above the shredding chamber 23 includes a plurality of low speed shredders 24a and 24b and an agitator 26. Referring now to FIG. 5, low speed shredder 24a includes shredder shaft 80 and low speed shredder 24b includes shredder shaft 82. The shredder shafts 80 and 82 are generally parallel to each other. The shredder shafts 80 and 82 are configured to rotate within the shredding chamber 23 and are fitted with a plurality of paddle assemblies 84. In the illustrated embodiment, the shredder shafts 80 and 82 are made of steel, although the shredder shafts 80 and 82 can be made of other materials, including aluminum or plastic, sufficient to rotate within the shredding chamber 23 and to be fitted with paddle assemblies 84. In the illustrated embodiment, the low speed shredders 24a and 24b each have a quantity of four paddle assemblies 84 fitted to the shredder shafts 80 and 82. In other embodiments, the shredders shafts 80 and 82 can be fitted with more or less than a quantity of four paddle assemblies 84. As further shown in FIG. 5, the paddle assemblies 84 extend in a generally perpendicular direction from the shredder shafts 80 and 82.

As further shown in FIG. 5, low speed shredder shaft 80 has a first paddle assembly 84a and low speed shredder shaft 82 has a second paddle assembly 84b. The first paddle assembly 84a has a major axis A extending along the length of the first paddle assembly 84a. Similarly, the second paddle assembly 84b has a major axis B extending along the length of the second paddle assembly 84b. In the illustrated embodiment, the major axis A of the first paddle assembly 84a is substantially perpendicular to the major axis B of the second paddle assembly 84b. The indexed arrangement of the first paddle assembly 84a and the second paddle assembly 84b in a substantially perpendicular orientation allows the first paddle assembly 84a and the second paddle assembly 84b to rotate in a same vertical plane C. Similarly, the remaining paddle assemblies 84 disposed on the low speed shredder shaft 80 have major axis that are indexed in substantially perpendicularly positions relative to the major axis of their corresponding paddle assemblies 84 disposed on the low speed shredder shaft 82. The indexed arrangement in a substantially perpendicular orientation of the corresponding paddle assemblies 84a and 84b allows the low speed shredders 24a and 24b to effectively shred and pick apart the loosefill insulation and prevent heavy clumps of loosefill insulation from moving past the shredders 24a and 24b into the agitator 26 thereby preventing an accumulation of loosefill insulation.

Figure 6:
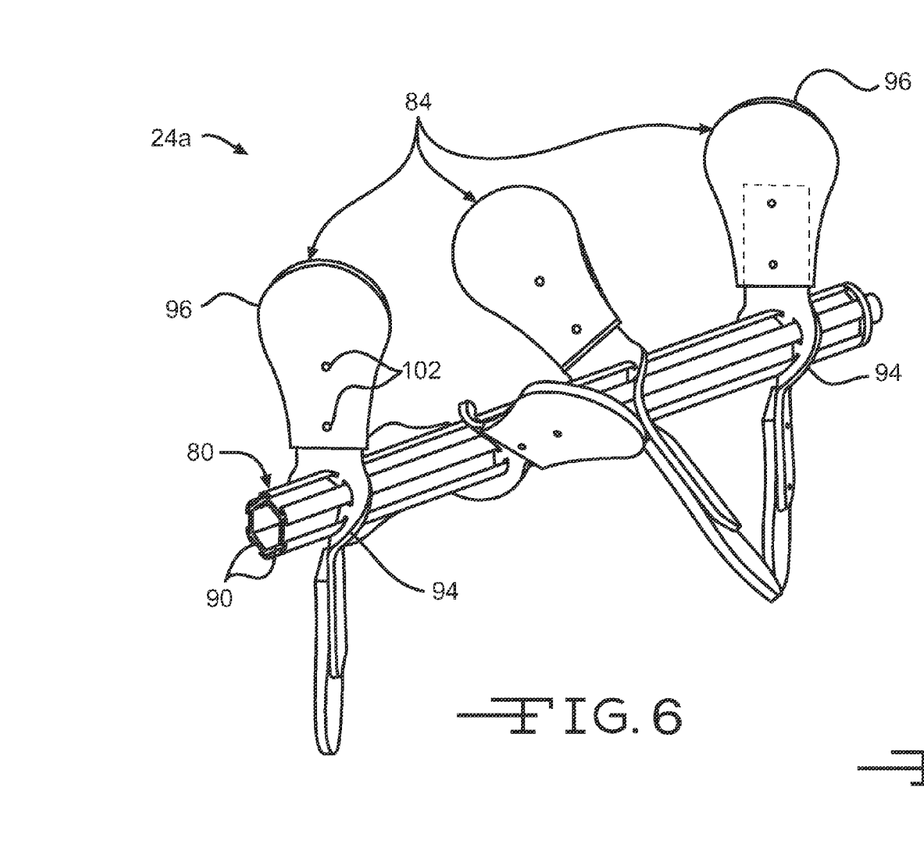
FIG. 6 is a perspective view of a low speed shredder of the blowing insulation machine of FIG. 1.
Figure 7:
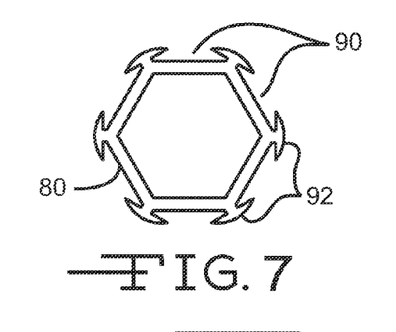
FIG. 7 is a front view in cross-section of a low speed shredder shaft of the low speed shredder of FIG. 5, taken along line 7-7.
Figure 8:
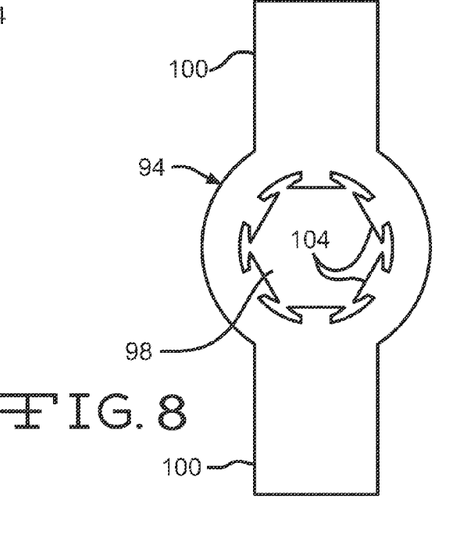
FIG. 8 is a front view in cross-section of a blade of the low speed shredder of FIG. 5, taken along line 8-8.

Referring now to FIG. 6, low speed shredder 24a includes shredder shaft 80 and a plurality of paddle assemblies 84. As shown in FIG. 7, shredder shaft 80 is a hollow rod having a plurality of flat faces 90 and alternate tangs 92 extending substantially along the length of the shredder shaft 80. Referring again to FIG. 6, each paddle assembly 84 includes a blade 94 and two spaced apart paddles 96. Referring now to FIG. 8, the blade 94 is a substantially flat member with an aperture 98 and two mounting arms 100. In the illustrated embodiment, the aperture 98 initially has a substantially circular shape. Alternatively, the aperture 98 can have other desired initial shapes, such as for example a substantially hexagonal shape.

As shown in FIG. 6, the paddles 96 are fastened to the mounting arms 100 by rivets 102. In other embodiments, the paddles 96 can be fastened to the mounting arms 100 by other fastening methods including the non-limiting examples of adhesives, clips or clamps. As shown in FIG. 8, the blades 94 include T-shaped projections 104 positioned within the aperture 98. In the embodiment illustrated in FIG. 6, each paddle assembly 84 includes a blade 94 having two mounting arms 100 and paddles 96 attached to each mounting arm 100. In other embodiments, each paddle assembly 84 can include more or less than two mounting arms 100, each having a paddle 96 attached to the mounting arm 100, such that the paddle assemblies 84 effectively shred and pick apart the loosefill insulation.

Referring again to FIG. 6, the blades 94 and the paddles 96 are mounted to the shredder shaft 80 by sliding the T-shaped projections 104 of the blades 94 onto the flat faces 90 of the shredder shaft 80. Once the blades 94 and the paddles 96 are positioned in the desired location along the shredder shaft 80, the mounting arms 100 of the blades 94 are twisted. Twisting of the mounting arms 100 causes the aperture 98 to deform. In some embodiments, the aperture 98 deforms from a substantially circular shape into a substantially elliptical shape. However, in other embodiments the aperture 98 can deform into other shapes. Deformation of the aperture 98 into a substantially elliptical shape causes the T-shaped projections 104 of the blades 94 to deform within the tangs 92 of the shredder shaft 80 thereby locking the blades 94 and the paddles 96 in position on the shredder shaft 80.

Referring again to FIG. 5, the twisted blades 94 and paddles 96 are locked on shredder shaft 82 at angle $\alpha$-1 relative to the major axis D of the blades 94 and paddles 96. In the illustrated embodiment, angle $\alpha$-1 is in a range of from about 40° to about 50°. However, in other embodiments, the angle $\alpha$-1 can be less than about 40° or more than about 50°. The orientation of the twisted blades 94 and paddles 96 at the angle $\alpha$-1 in a range of from about 40° to about 50° provides for efficient shredding of the loosefill insulation.

Referring again to FIG. 5, the low speed shredders 24a and 24b include a plurality of paddle assemblies 84, each paddle assembly 84 having a plurality of paddles 96. In the illustrated embodiment, the paddles 96 are made of a rubber-based material and have a hardness rating of 60 A to 70 A Durometer. A hardness rating of between 60 A to 70 A allows the paddles 96 to effectively grip the loosefill insulation for shredding while preventing jamming of the loosefill insulation in the shredders 24a and 24b. Optionally, the paddles 96 can have a hardness greater than 70 A or less than 60 A. In another embodiment, the paddles 138 can be made of other materials, such as aluminum or plastic, sufficient to effectively grip the loosefill insulation for shredding while preventing jamming of loosefill insulation in the shredders 24*a* and 24*b*.

Referring again to FIG. 4, the low speed shredders 24*a* and 24*b* include a plurality of paddle assemblies 84 mounted to shredder shafts 80 and 82. The plurality of paddle assemblies 84 are mounted on each shredder shaft 80 and 82 such that adjacent paddle assemblies 84 on the same shredder shaft 80 or 82 are offset from each other by an angle α-2. Offsetting the adjacent paddle assemblies 84 from each other on the shredder shafts 80 and 82 allows the paddle assemblies 84 to effectively grip the loosefill insulation for shredding while preventing jamming of the loosefill insulation in the shredders 24*a* and 24*b*. In the illustrated embodiment, the offset angle α-2 of the adjacent paddle assemblies 84 is approximately 60°. In other embodiments, the offset angle α-2 can be less than or more than 60°, sufficient to effectively grip the loosefill insulation for shredding while preventing jamming of the loosefill insulation in the shredders 24*a* and 24*b*.

Referring again to FIG. 5, the low speed shredders 24*a* and 24*b* include a plurality of paddle assemblies 84 mounted to shredder shafts 80 and 82. In the illustrated embodiment, the shredder shafts 80 and 82 are substantially physically identical. Similarly, the paddle assemblies 84 mounted to the shredder shafts 80 and 82 are substantially physically identical and mounted to the respective shredder shafts 80 and 82 in the same manner. The shredders 24*a* and 24*b* are assembled to be identical for ease of replacement. It is to be understood that the shredder shafts 80 and 82 can be different. Similarly, in another embodiment, the shredders 24*a* and 24*b* can be different.

The principle and methods of assembly of the blowing insulation machine have been described in its preferred embodiments. However, it should be noted that the assembly of the blowing insulation machine may be practiced otherwise than as specifically illustrated and described without departing from its scope.

What is claimed is:

1. A method of assembling a machine for distributing loosefill insulation from a package of compressed loosefill insulation, the method comprising the steps of:

providing a chute having an inlet end, the inlet end configured to receive the package of compressed loosefill insulation;

providing a lower unit including a shroud, the lower unit being configured to be attached to the chute to form the machine for distributing loosefill insulation, the lower unit having an outlet for the discharge of loosefill insulation;

installing a plurality of shredders in the lower unit, the shredders being configured to shred and pick apart the loosefill insulation;

installing a discharge mechanism in the lower unit, the discharge mechanism being configured to discharge loosefill insulation from the outlet of the lower unit;

providing a bottom wall structure, the bottom wall structure having a first bottom wall spaced apart from a second bottom wall, the first bottom wall configured to absorb impact from objects underneath the lower unit without substantially transferring the impact to the second bottom wall; and connecting the bottom wall structure to the shroud.

2. A method of assembling a machine for distributing loosefill insulation from a package of compressed loosefill insulation, the method comprising the steps of:

providing a chute having an inlet end, the inlet end configured to receive the package of compressed loosefill insulation;

providing a lower unit including a shroud, the lower unit being configured to be attached to the chute to form the machine for distributing loosefill insulation, the lower unit having an outlet for the discharge of loosefill insulation;

installing a plurality of shredders in the lower unit, the shredders being configured to shred and pick apart the loosefill insulation;

installing a discharge mechanism in the lower unit, the discharge mechanism being configured to discharge loosefill insulation from the outlet of the lower unit;

providing a bottom wall structure, the bottom wall structure having a first bottom wall spaced apart from a second bottom wall;

arranging the first bottom wall and the second bottom wall in a generally parallel orientation; and connecting the bottom wall structure to the shroud.

3. The method of claim 2, including the step of forming a passage between the first bottom wall and the second bottom wall, the passage configured for a flow of air to a blower, wherein the passage has a height in a range of from about 0.50 inches to about 2.0 inches.

4. The method of claim 3, including the step of connecting the passage between the first bottom wall and the second bottom wall with a blower, the blower being configured to provide an airstream to the discharge mechanism.

* * * * *